(12) United States Patent
Satoyama et al.

(10) Patent No.: US 9,256,490 B2
(45) Date of Patent: Feb. 9, 2016

(54) STORAGE APPARATUS, STORAGE SYSTEM, AND DATA MANAGEMENT METHOD

(71) Applicant: HITACHI, LTD., Tokyo (JP)

(72) Inventors: Ai Satoyama, Tokyo (JP); Hiroaki Akutsu, Tokyo (JP); Mikio Fukuoka, Tokyo (JP); Eiju Katsuragi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 12 days.

(21) Appl. No.: 14/373,918

(22) PCT Filed: Sep. 27, 2013

(86) PCT No.: PCT/JP2013/076366
§ 371 (c)(1),
(2) Date: Jul. 23, 2014

(87) PCT Pub. No.: WO2015/045122
PCT Pub. Date: Apr. 2, 2015

(65) Prior Publication Data
US 2015/0254128 A1    Sep. 10, 2015

(51) Int. Cl.
*G06F 11/00* (2006.01)
*G06F 11/08* (2006.01)
*G06F 11/10* (2006.01)
*G06F 11/16* (2006.01)
*G06F 12/16* (2006.01)

(52) U.S. Cl.
CPC .............. *G06F 11/085* (2013.01); *G06F 11/08* (2013.01); *G06F 11/10* (2013.01); *G06F 11/1076* (2013.01); *G06F 11/1658* (2013.01); *G06F 12/16* (2013.01)

(58) Field of Classification Search
CPC ..... G06F 11/08; G06F 11/10; G06F 11/1658; G06F 21/64; G06F 11/1076; G06F 11/108; G06F 11/1092; G06F 11/1096; G06F 2211/1028; G06F 11/1004
See application file for complete search history.

(56) References Cited

U.S. PATENT DOCUMENTS

| 6,023,780 | A | 2/2000 | Iwatani | |
|---|---|---|---|---|
| 2006/0059408 | A1* | 3/2006 | Chikusa | G06F 11/1076 714/770 |
| 2008/0155193 | A1 | 6/2008 | Daikokuya et al. | |
| 2009/0287956 | A1* | 11/2009 | Flynn | G06F 11/1008 714/6.12 |
| 2010/0023847 | A1 | 1/2010 | Morita et al. | |
| 2014/0258775 | A1* | 9/2014 | Flynn | G06F 11/1096 714/6.21 |

FOREIGN PATENT DOCUMENTS

| JP | 09-305328 A | 11/1997 |
|---|---|---|
| JP | 2008-158724 A | 7/2008 |
| JP | 2010-033287 A | 2/2010 |

* cited by examiner

*Primary Examiner* — Charles Ehne
(74) *Attorney, Agent, or Firm* — Mattingly & Malur, PC

(57) ABSTRACT

The storage apparatus has a control unit that includes: an identification unit that is configured to determine that a first data element contained in the data is incorrect, when a first restoration calculation first data element, which is restored from the first data element using other data elements of the data excluding the first data element and a new redundancy code obtained from the data by a first calculation method, coincides with a second restoration calculation first data element, which is restored from the first data element using the other data elements and a new redundancy code obtained from the data by a second calculation method; and a restoration unit that is configured to correct the first data element in the storage devices that is determined to be incorrect by the identification unit, to either the first restoration calculation first data element or the second restoration calculation first data element.

10 Claims, 13 Drawing Sheets

| Disk device unit number | Disk device number | Group number | State |
|---|---|---|---|
| 0 | 0 | 0 | Normal |
| | 1 | 0 | Failure |
| | 2 | 0 | Normal |
| | | | |
| 1 | 0 | 1 | Normal |
| | 1 | 1 | Normal |
| | 2 | 1 | Reserve |
| | | | |

Fig. 5

| Group number | RAID level |
|---|---|
| 0 | RAID6 6D+2P |
| 1 | RAID6 6D+2P |

STORAGE APPARATUS, STORAGE SYSTEM, AND DATA MANAGEMENT METHOD

TECHNICAL FIELD

The present invention is related to a technology for protecting data in a storage system.

BACKGROUND ART

Data redundancy systems that have redundancy of two or more and are highly redundant and highly capacity efficient such as Erasure Coding are becoming popular. More specifically, redundancy systems employed in RAID (Redundant Arrays of Independent (or Inexpensive) Disks), Microsoft Azure ad Facebook and the like are some examples.

A storage system that employs a RAID is provided with a RAID group constituted of a plurality of storage devices (for instance, hard disk drives (HDDs). A storage area of the RAID group is constituted of a plurality of sub-storage area columns, a "stripe columns", formed across a plurality of storage devices. Hereinafter, one sub-storage area of each storage device constituting the stripe column is referred to as a "stripe".

RAIDs have some levels (hereinafter referred to as a "RAID level").

For instance, in a RAID5, write target data specified by a host computer is divided into data of a predetermined size (hereinafter referred to as a "data unit", for the sake of convenience), and each data unit is divided into a plurality of data elements, and the plurality of data elements are written on a plurality of the stripes, respectively.

In a RAID 5, redundant information called "parity" (hereinafter referred to as a "redundancy code") is generated for one data unit, and the redundancy code is written on a stripe. When a failure occurs in a storage device and it becomes impossible to read a correct value of a data element that constitutes the data unit, the data element is restored by using the parity.

A RAID 6 is able to withstand even a double failure. In the RAID 6, two (two kinds of) redundant codes are generated for each stripe column. A double failure can be coped with by using the two redundant codes. PTL 1 discloses that a data error is detected by comparing two pieces of parity.

CITATION LIST

Patent Literature

[PTL 1]
Japanese Patent Application Publication No. 2010-33287

SUMMARY OF INVENTION

Technical Problem

With the advancement and the function enhancement of architectures of storage apparatuses and multifunctionalization of native flashes, storage control microprograms tend to become complicated. Consequently, causes for failures and kinds of failures are diversified. In other words, risks of data breakage without an error detected (silent data corruption) to occur are increasing.

For instance, there is a case in which access to correct data is not possible not because data itself is broken but because an address within a mapping table of data storage places in a drive is broken. Another example is that a phenomena may occur in which, even when data storage position is changed with dynamic sparing or collection copy, an old data storage position is accessed owing to an address being broken and only part of data returns to old data. However, there may be a case in which, when data itself is not broken but an address is broken, an error is not detected by a check with a conventional general simple check code.

In PTL 1, when new and old first pieces of parity are different to each other and new and old second pieces of parity are different to each other, a data segment is determined to be broken. However, when both of the first piece of parity and the second piece of parity are broken, a state may occur in which the new and old first pieces of parity are different to each other and the new and old second pieces of parity are different to each other. In that case, although the first piece of parity and the second piece of parity should normally be corrected, a wrong correction is made to the data segment in PTL 1.

An object of the present invention is to provide a technology that improves degrees of certainty of identifying and restoring a broken portion of data added with a redundancy code.

Solution to Problem

A storage apparatus of one embodiment of the present invention comprises a control unit configured to manage data that is divided into a plurality of data elements and is stored in a plurality of storage devices, wherein a plurality of old redundancy codes generated in advance by a plurality of different calculation methods for data containing a plurality of data elements are stored in the storage devices as redundancy codes for the data, and the control unit includes: an identification unit that is configured to determine that a first data element contained in the data is incorrect, when a first restoration calculation first data element, which is restored from the first data element using other data elements of the data excluding the first data element and a new redundancy code obtained from the data by a first calculation method, coincides with a second restoration calculation first data element, which is restored from the first data element using the other data elements and a new redundancy code obtained from the data by a second calculation method; and a restoration unit that is configured to correct the first data element in the storage devices that is determined to be incorrect by the identification unit to either the first restoration calculation second data element or the second restoration calculation first data element.

Advantageous Effects of Invention

According to the present invention, it is possible to improve degrees of certainty in identifying and restoring a broken portion of data added with a redundancy code.

BRIEF DESCRIPTION OF DRAWINGS

FIG. 5 is a view illustrating a table 500 for managing a physical disk device 34.

FIG. 6 is a view illustrating a table example for managing RAID group numbers.

FIG. 7A is a view illustrating failure occurrence cases (cases of redundancy of 2).

FIG. 7B is a view illustrating failure occurrence cases (cases of redundancy of 3).

DESCRIPTION OF EMBODIMENTS

Figure 1:
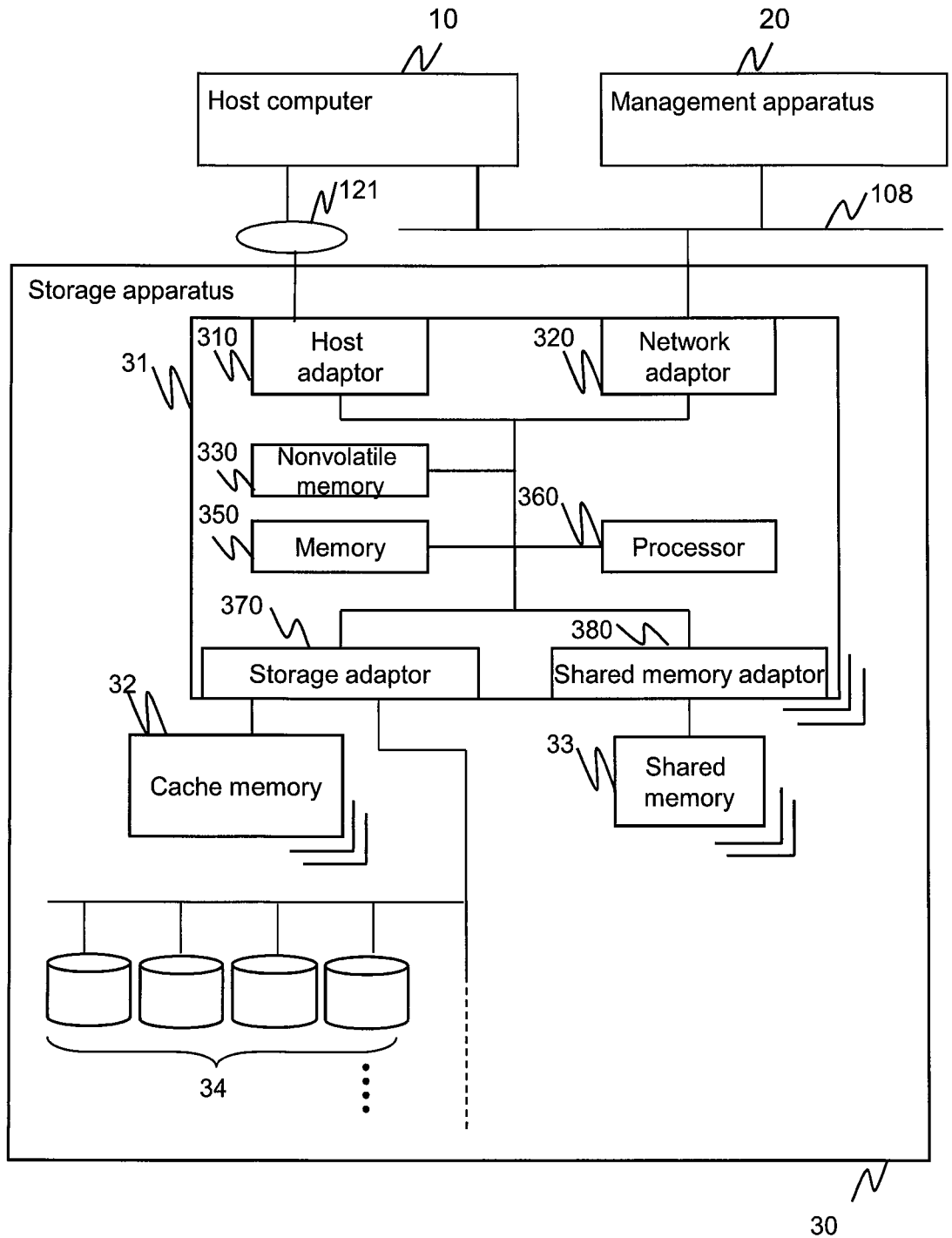
FIG. 1 is a hardware block diagram illustrating a configuration example of a computer system according to the present embodiment.

An embodiment of the present invention is described by referring to drawings.

The present embodiment is only an example for achieving the present invention and does not limit a technical range of the present invention. An identical reference numeral is assigned to a configuration common to each drawing.

Although, in the following description, the information of the present invention is described in an expression of a "table", these pieces of information may not necessarily be expressed by a data structure with a table, and may be expressed by a data structure or else with a "list", a "DB (database)", and a "queue". To indicate the independence from a data structure, a "table", a "list", a "DB", a "queue", and such may be simply referred to as "information". When describing content of each piece of information, it is possible to use an expression such as "identification information", an "identifier", a "title", a "name", an "ID", and these are replaceable to each other.

In the following description, although a "program" may be used as a subject in the description, since a program performs predetermined processing by being executed by a processor while using a memory and a communication port (a communication control apparatus), a description using a processor as a subject may be acceptable. Processing that is disclosed using a program as a subject may be processing that is performed by a computer or an information processing apparatus such as a management server. A part of or all of a program may be achieved by a dedicated hardware or by a module. Various programs may be installed in each computer by a program distribution server or a storage medium.

FIG. 1 is a hardware block diagram illustrating a configuration example of a computer system according to the present embodiment. A computer system 1 includes: at least one host computer 10 (a general-purpose large-sized computer, or a server, or the like); at least one management apparatus (a management computer) 20; and at least one storage apparatus 30 coupled thereto. The storage apparatus 30 may be referred to as a storage system or a storage subsystem.

The host computer 10 accesses a logical storage resource of the storage apparatus 30. The management apparatus 20 manages a configuration of storage areas of the storage apparatus 30. The storage apparatus 30 stores data in the storage areas configured in the physical disk device 34. The host computer 10 may be a plurality of machines.

The host computer 10 includes, for instance, an input device, an output device, a CPU (Central Processing Unit), a memory, a disk adaptor, a network adaptor, and a disk drive.

A input device is means that accepts an input from an administrator and such who operates the host computer 10, and is composed of a keyboard, a mouse, and such, for instance. An output device is means for displaying a state of the host computer 10 or configuration items, and is composed of a display apparatus, a printer, and such, for instance. The CPU (a controller or a processor) reads a program stored in the disk drive into the memory and executes processing specified in the program. The memory is composed of, for instance, a RAM (Random Access Memory) and such, and stores a program, data, and such.

The disk adaptor is coupled to the storage apparatus 30 through a storage area network 121, and transmits and receives data to and from the storage apparatus 30. The storage area network 121 achieves data transfer with a protocol suitable for data transfer (for instance, a Fibre Channel). The disk adaptor may be directly coupled to an adaptor of the storage apparatus 30.

The network adaptor transmits and receives data to and from the management apparatus 20 or the storage apparatus 30 through a network 108 which is a management network. The network 108 is composed of a local area network (LAN), Ethernet (a registered trademark), for instance. The disk drive is composed of, for instance, a hard disk device, and stores data and a program.

The management apparatus 20, for instance, includes an input device, an output device, a CPU, a memory, a network adaptor, and a disk drive.

The input device is means for accepting an input from an administrator and such who operates the management apparatus 20, and is composed of a keyboard, for instance. The output device is means for displaying a state of the management apparatus 20 or configuration items, and is composed of a display apparatus, for instance.

The CPU reads a management program stored in the disk drive and performs management processing for the storage apparatus 30 on the basis of the program. The memory is composed of, for instance, a RAM and such, and stores a program, data, and such.

The network adaptor transmits and receives data to and from the host computer 10 or the storage apparatus 30 through the network 108. The disk drive is composed of, for instance, a hard disk device, and stores data and a program.

The storage apparatus 30 includes a controller 31, at least one cache memory 32, at least one shared memory 33, and the physical disk device 34. An internal hardware configuration of the controller 31 is redundant.

The controller 31 controls to store data into storage areas configured in the physical disk device 34. The cache memory 32 temporarily stores data that is written and read to and from the physical disk device 34. The shared memory 33 stores configuration information of the controller 31 and the physical disk device 34.

The physical disk device 34 is composed of a plurality of disk devices. The disk devices (the storage devices) are composed of hard disk drives, for instance, and store mainly user data. For the storage device, a drive composed of a semiconductor memory such as a flash memory may be used. The disk device constitutes a group on the basis of a RAID configuration.

The controller 31 includes at least a processor 360, and, in this embodiment, further includes a host adaptor 310, a network adaptor 320, a nonvolatile memory 330, a memory 350, a storage adaptor 370, and a shared memory adaptor 380.

The host adaptor 310 transmits and receives data to and from the host computer 10 through the storage area network 121. The network adaptor 320 transmits and receives data (management information) required for system management to and from the host computer 10 or the management apparatus 20 through the network 108.

The nonvolatile memory 330 is composed of a hard disk or a flash memory, and stores a program that operates in the controller 31, configuration information, and such.

The memory 350 is composed of, for instance, a RAM and such, and stores a program, data, and such. The processor 360 reads a program stored in the nonvolatile memory 330 into the memory 350 and executes processing specified in the program.

The storage adaptor 370 transmits and receives data to and from the physical disk device 34 and the cache memory 32. The shared memory adaptor 380 transmits and receives data to and from the shared memory 33.

Another network adaptor 390 in addition to the network adaptor 320 may be provided and the storage apparatus 30 may be coupled to an external storage apparatus 40 through a second network. A storage area network (SAN) may be used for the second network, for instance. The storage apparatus 40 may be equivalent to the storage apparatus 30 or may be an optical disc library or the like. The storage apparatus 40 is not directly coupled to the host computer 10 through a network, but may be accessed through the storage apparatus 30. The storage apparatus 40 is coupled to the management apparatus 20 through the network 108.

Figure 2:
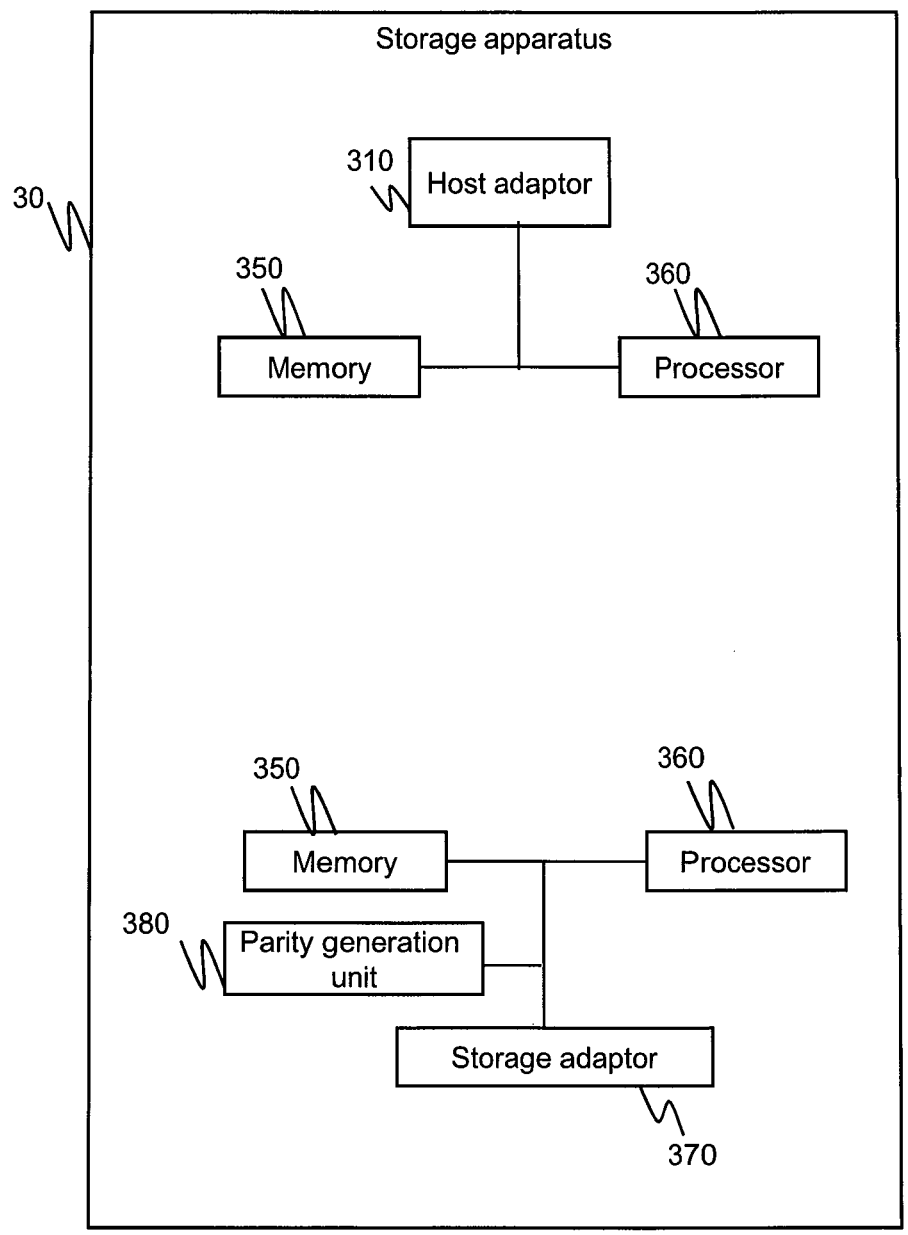
FIG. 2 is a diagram illustrating a configuration example different from FIG. 1 of a storage apparatus 30.

FIG. 2 is a diagram illustrating a configuration example different from FIG. 1 of the storage apparatus 30. FIG. 2 shows only a part necessary to illustrate the difference between the storage apparatus 30 of the present example and the storage apparatus 30 in FIG. 1.

In this example, two kinds of adaptors (packages) with a processor and a memory as a unit are provided for the host computer side and the disk device side. One on the drive device side is provided with a parity generating unit 380. The parity generating unit 380, when a failure occurs in the physical device (the hard disk), generates a redundancy code (hereinafter referred to as "parity") for restoring the data that becomes unreadable owing to the failure.

In the present embodiment, although the parity generating unit 380 is a hardware circuit for generating parity, the parity generating unit 380 may be a function incorporated in a computer program. The parity generating unit 380, for instance, generates parity by performing XOR of a plurality of data elements constituting a data unit (or, by performing XOR of each piece of data after multiplying a plurality of data elements constituting a data unit by a predetermined coefficient).

Figure 3:
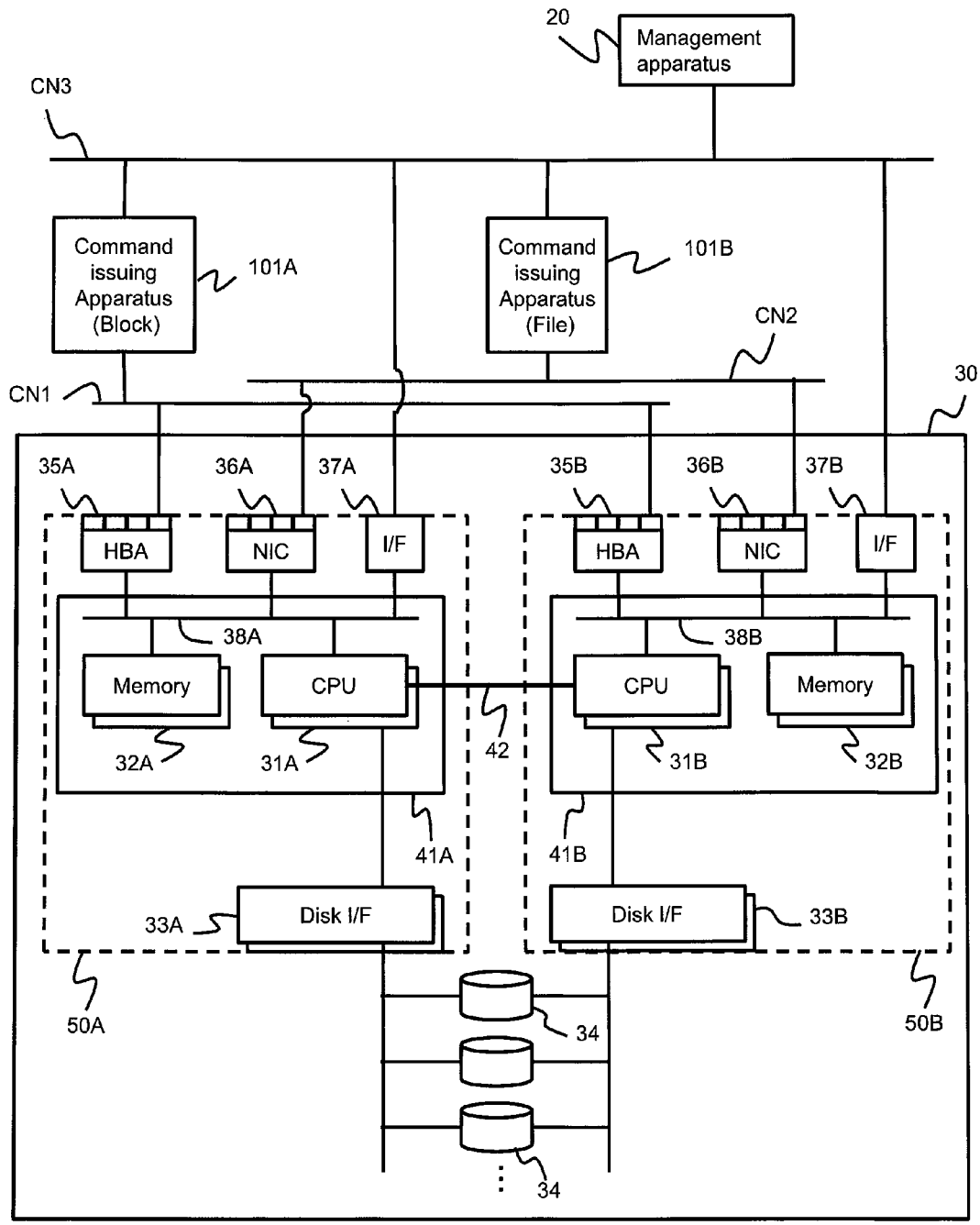
FIG. 3 is a hardware block diagram illustrating a configuration example of a computer system different from FIG. 1.

FIG. 3 is a hardware block diagram illustrating a configuration example of a computer system different from FIG. 1.

In this example, the computer system includes the storage apparatus 30, the command issuing apparatuses 101A and 101B that use the storage apparatus 30, and the management apparatus 20 that manages the storage apparatus 30 and the command issuing apparatuses 101A and 101B. A plurality of storage apparatuses 30 may be provided. The storage apparatus 30 may be referred to as a storage apparatus, a storage subsystem, or a unified storage system.

The command issuing apparatus 101A and 101B are computers that use the storage apparatus 30. One command issuing apparatus 101A is a computer that issues a block command for accessing a logical storage resource included in the storage apparatus 30. The other command issuing apparatus 101B is a computer that issues a file command to the storage apparatus 30.

The command issuing apparatus 101A includes an FC (FibreChannel), an iSCSI (internet Small Computer System Interface), or the like, which is a block command issuing apparatus and a block interface. The command issuing apparatus 101A communicates with an HBA 35A and 35B included in the storage apparatus 30 through a communication network CN1.

The command issuing apparatus 101B includes an NFS (Network File System), a CIFS (Common Internet File System), or the like, which is a file command issuing apparatus and a file interface. The command issuing apparatus 101B communicates with an NIC 36A and 36B included in the storage apparatus 30 through a communication network CN2.

The management apparatus 20 manages a configuration of storage areas of the storage apparatus 30.

The storage apparatus 30 is configured as a unified storage system capable of simultaneously processing both block command and file command, and includes a plurality of clusters 50A and 50B. Each of the clusters 50A and 50B includes a controller board 41A and 41B, respectively. In the configuration of the storage apparatus 30, a suffix "A" or "B" represents a cluster to belong. When not particularly discriminating a cluster to belong, description is made by removing the suffix.

The storage apparatus 30 stores data in storage areas configured in the physical disk device 34. The storage apparatus 30 includes therein a CPU 31 that is a control processor (a controller), a memory (a cache memory) 32, a disk interface 33, an HBA 35 (an HBA target and also referred to as a host adaptor) that is an FC interface, an NIC 36 that is an LAN interface, a management interface 37, and such.

The CPU 31, the memory 32, the HBA 35, the NIC 36, and the disk interface 33 are mutually coupled to each other through a bus 38. The bus 38 is, for instance, a PCIe. The bus 38 may be configured from a switch.

The CPU 31 is a calculation processing apparatus that executes various programs and program modules stored in the memory 32. The CPU 31 controls data input, output, and such to and from a logical storage area configured by using the physical disk device 34.

The memory 32 is so called an internal storage apparatus and contains a nonvolatile memory and a volatile memory. The nonvolatile memory stores a program that operates in the CPU 31, the configuration information, and such. The volatile memory temporarily stores a processing result.

The disk interface 33 is in charge of data transmission and reception between the physical disk device 34 and the memory 32 and such.

The physical disk device 34 is similar to FIG. 1.

A logical volume, which is a logical storage area, can be generated by grouping storage areas included in one or a plurality of physical disk devices 34 and cutting out a storage area either in a fixed length or a variable length from the grouped storage areas. User data is mainly stored in the logical volume. A part or all of the programs that are executed by the CPU 31 may be stored in the physical disk device 34.

The physical disk device 34 constitutes a group on the basis of a RAID configuration (for instance, a RAID5 or a RAID6).

Being configured as so called a unified storage system, the storage apparatus 30 of the present embodiment includes both the host side interface (HBA) 35 for processing a block command and the host side interface (NIC) 36 for processing a file command.

The HBA 35 is coupled to the command issuing apparatus 101A through the network CN1 and includes a plurality of communication ports. The HBA 35 delivers and receives a command and data to and from the command issuing apparatus 101A. The network CN1 is, for instance, an FC, an Ethernet (a registered trademark), or the like.

The NIC 36 is coupled to the command issuing apparatus 101B through the network CN2 and includes a plurality of communication ports. The NIC 36 delivers and receives a command and data with, for instance, the command issuing apparatus 101B by a protocol such as the NFS or the CIFS. The network CN2 is configured as the LAN or the like, for instance.

The command issuing apparatus 101A and 101B are coupled to the management apparatus 20 through a management network CN3. The command issuing apparatus 101A and 101B transmit and receive data (management information) required for system management to and from the management apparatus 20.

The storage apparatus 30 includes a management interface 37 configured as, for instance, a LAN. The management interface 37 is coupled to the CPU 31. When a failure occurs in a portion other than the CPU 31 within the storage apparatus 30, the CPU 31 is capable of reporting the information concerning the failure to the management apparatus 20 through the management interface 37.

The storage apparatus 30 includes a plurality of clusters 50A and 50B for enhancing the availability.

In the storage apparatus 30, controller boards 41A and 41B are provided for controlling the cluster 50A and 50B. One controller board 41A is for controlling one cluster 50A and may be referred to as a first controller board. The other controller board 41B is for controlling the other cluster 50B and may be referred to as a second controller board.

A CPU 31A in one controller board 41A and a CPU 31B in the other controller board 41B are coupled to each other through a coupling unit 42 that enables mutual communication. The coupling unit 42 is configured as, for instance, a bus of a dedicated line, a switch, or the like.

Here, a dedicated bus is used that directly communicates between the CPUs.

One CPU 31A is capable of accessing the other CPU 31B through the coupling unit 42. Similarly, the other CPU 31B is capable of accessing one CPU 31A through the coupling unit 42.

The cluster 50A and the cluster 50B are configured to be a cluster configuration for enhancing the availability.

Figure 4:
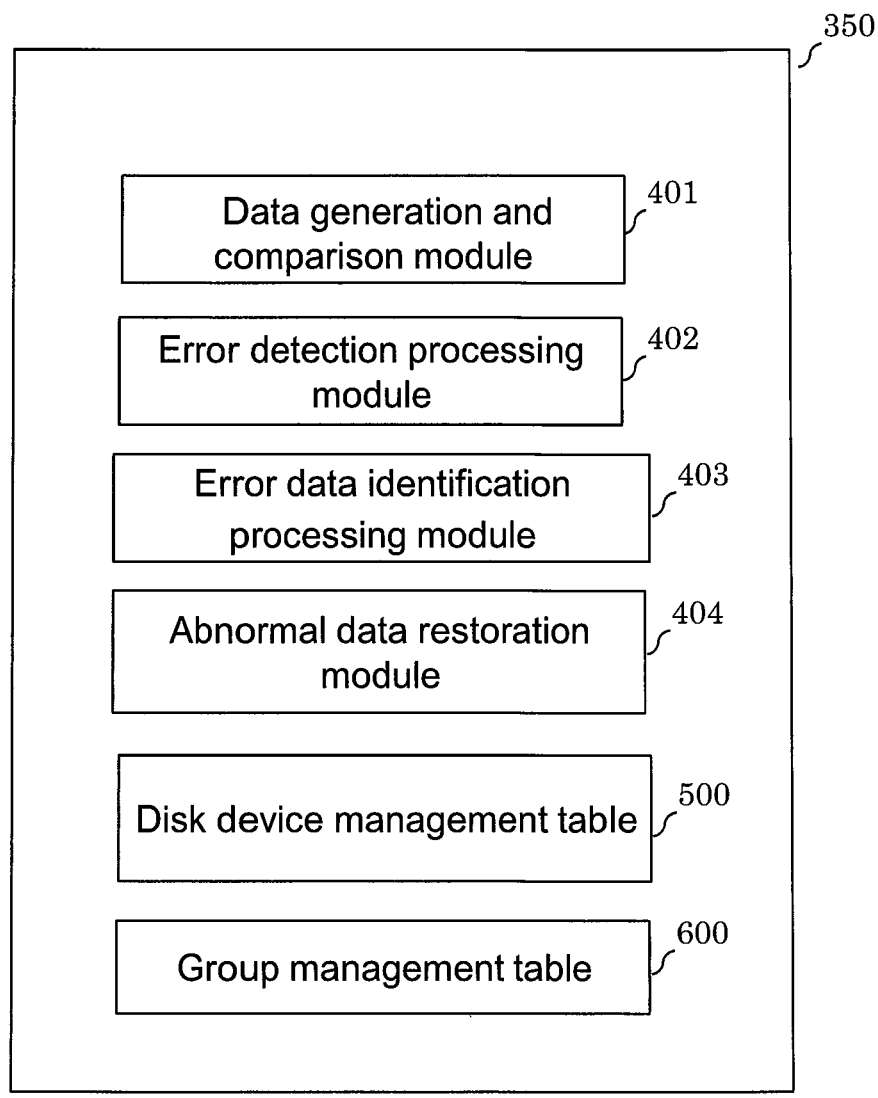
FIG. 4 is a view illustrating a configuration example of a software program executed at the storage apparatus 30 of the present embodiment.

FIG. 4 is a view illustrating a configuration example of a software program executed at the storage apparatus 30 of the present embodiment. In this example, the software program contains a data generation and comparison module 401, an error detection processing module 402, an error data identification processing module 403, and an abnormal data restoration module 404. A disk device management table 500 and a group management table 600 are referred to by the software program.

When power of the storage apparatus 30 is applied, the processor 360 of FIG. 1 or the CPU 31 of FIG. 3 loads the program stored in a storage area of the physical disk device 34, into the memory 350 or the memory 32 and executes the program.

As a variation, the memory 32 may be composed of a plurality of kinds of memories. One example is a flash memory board. In the flash memory board, a processor and a memory are configured and processing may be performed by storing the program in the flash memory board. By providing hardware such as a dedicated circuit in the storage apparatus 30 to store the program, the processing may be performed in a circuit.

As a variation, the program may be stored in the host computer 10, a memory in the command issuing apparatus 101, a memory board as described above, or hardware such as a dedicated circuit. At that time, a program for parity calculation may be stored in the same place.

FIG. 5 is a view illustrating a table 500 for managing a physical disk device 34. The physical disk device 34 is composed of a disk drive unit 501, which is a mechanism for controlling to drive a disk device. A mechanism of controlling is a control circuit, for instance. A device number is a number 502 for identifying the disk device. There are a storage capacity (not described) of a used amount included in the physical disk device 34 and a RAID group number 503 to which the physical disk device 34 belongs. The physical disk device 34 may be managed with serial numbers and not with a combination of 501 and 502. States of the physical disk device 34 is shown in 504. For instance, it becomes "Normal" when being operated normally, "Reserve" when standing by as a reserve disk, and "Failure" when being under restoration owing to a disorder.

FIG. 6 is a view illustrating a table example for managing RAID group numbers. RAID group number 601 and RAID level 602 are contained. The RAID group is formed by grouping single unit disk devices and make them a RAID. From one RAID group, a plurality of logical devices used in the host computer 10 are constituted.

FIG. 7 is a view illustrating failure occurrence cases.

Figures 7A, 7B:
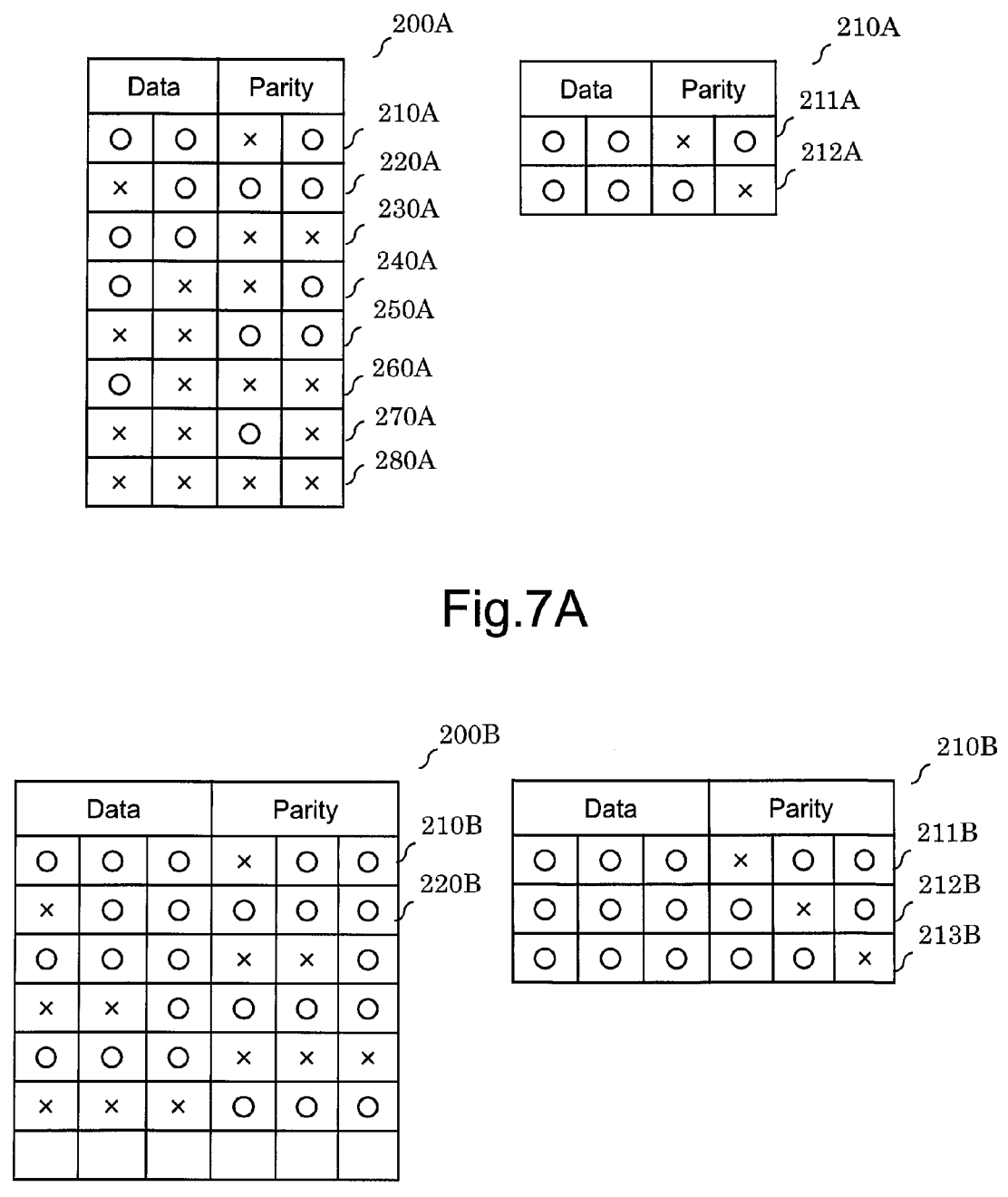

FIG. 7A illustrates cases where the redundancy is 2. The illustration is made by taking a method having two pieces of parity each of which is one of the redundancies as an example. Although the illustration is made here for cases where there are two data elements each of which constitutes a data unit (hereinafter simply referred to as "data"), cases where there are two or more data elements are similar.

All patterns of failure occurrence cases are illustrated in 200A. In the view, a "o" (a circle) indicates normal and a "x" (x-mark) indicates failure. For instance, a case in 210A where two pieces of data are normal and a failure occurs in one piece of parity in one stripe unit is illustrated. 210A includes a case like 211A where one piece of parity is failure and a case like 212A where the other piece of parity is failure. Which piece of parity is failure is not an essential element of the present invention. Since what is important is how many pieces of parity occur, patterns of 211A and 212A are integrated into 210A. 220A represents that a failure occurs only in one data.

230A to 250A illustrate double failure cases. 230A is a case where both two pieces of parity are failure. 240A is a case where one piece of data is failure and one piece of parity is failure. 250A is a case where both two pieces of data are failure.

FIG. 7B is a case where the redundancy is 3, which is almost similar to the case where the redundancy is 2.

For instance, 210B represents a case where three pieces of data are normal and a failure occurs in one piece of parity. There are three cases in 210B like 211B, 212B, and 213B where one piece of parity is failure among the pieces of parity. Since which one piece of parity is failure is not an essential element of the present invention and what is important is how many pieces of parity occur, patterns of 211B, 212B, and 213B are integrated into 210B.

Even in a case where the redundancy is n, failure situations can be similarly organized.

<Outline>

First of all, a function configuration and an outline of operation of the controller 31 of the storage apparatus 30 of the present embodiment will be described. Here, the operation is described by referring to FIG. 1 and FIG. 4 and making the program module illustrated in FIG. 4 the subject. After describing the outline, the details of the present embodiment will be described. The configuration and the operation of the present embodiment will be made clearer with the detailed description.

As referenced in FIG. 1, the storage apparatus 30 includes the controller 31 and manages data that is divided into a plurality of data elements and stored in a plurality of physical disk devices 34 (storage devices).

For data containing a plurality of data elements, a plurality of redundancy codes (old redundancy codes) generated in advance by a plurality of different calculation methods are stored in the physical disk devices 34 as redundancy codes (pieces of parity) for the data.

The error detection processing module 402 illustrated in FIG. 4 calculates new redundancy codes from data stored in the physical disk device 34 by a plurality of calculation methods. The plurality of calculation methods include a first calculation method and a second calculation method described later. When old redundancy codes and the corresponding new redundancy codes coincide in all calculation methods, the error detection processing module 402 determines that neither of the data and the old redundancy codes are incorrect. When old redundancy codes and the corresponding new redundancy codes do not coincide in all calculation methods, the error detection processing module 402 determines that the data are incorrect. When an old redundancy code and the corresponding new redundancy code do not coincide in part of calculation methods, the error detection processing module 402 determines that the old redundancy code is incorrect. Thereby, in the present embodiment, not only when data is broken but when a redundancy code is broken, the broken portions can be identified.

The error data identification processing module 403 restores a first data element using other data element excluding a first data element contained in the data and a new redundancy code obtained from the data by the first calculation method and make it a first restoration calculation first data element. The error data identification processing module 403 similarly restores a first data element using other data element excluding a first data element and a new redundancy code obtained from the data by the second calculation method and make it a second restoration calculation first data element. When the first restoration calculation first data element and the second restoration calculation first data element coincide, the error data identification processing module 403 determines that the first data element is incorrect.

The abnormal data restoration module 404 corrects the first data element in the physical disk device 34 that is determined to be incorrect by the error data identification processing module 403 to the first restoration calculation first data element or the second restoration calculation second data element.

According to the present embodiment, since, when, with the rest of the data element obtained by removing an arbitrary data element from the data and a respective redundancy codes obtained by a plurality of calculation methods, the removed data is restored and the same data element is restored by a plurality of calculation methods, the removed data element is determined to be incorrect and restored it to the restored element value, it is possible to improve degrees of certainty of the identification of the broken portion of the data added with the redundancy code and the restoration.

The error detection processing module 402, when it determines that an old redundancy code is incorrect, corrects a redundancy code in the physical disk device 34 to a corresponding new redundancy code. Thereby, when a redundancy code is broken, the redundancy code can be restored.

The error data identification processing module 403 searches for an incorrect data element while changing the number of data elements to be excluded as first data elements from one to (the number of redundancy codes-1). For instance, the number of data elements to be excluded may be gradually increased from one. Thereby, breakages of data elements up to (the number of redundancy codes-1) can be identified and restored.

The error detection processing module 402, when a data movement occurs between the physical disk devices 34, processing is performed according to the data movement. Thereby, since, when an event in which a possibility of a breakage of data and such to occur is relatively high occurs, the breakage is detected and restored, efficient detection and restoration of the breakage can be performed.

Hereinafter, details of the present embodiment will be described.

<Verify Method>

Error detection processing and error data identification processing of the present embodiment will be described.

The present processing performs sequential processing, for instance, such as in an address sequence, for instance, for each LU in a stripe unit within the LU.

When data of processing target is clean (a state in which the latest data is stored in the physical disk device and data that is the same as the stored data is stored in the cache memory), the processing target is moved to the next stripe without checking. When data of processing target is dirty (a state in which the latest data is not stored in the physical disk device but stored in the cache memory), the processing target is moved, because data itself is different in the first place, which makes the processing meaningless.

When part of the data in stripe unit is not stored in the cache memory, processing of reading data and parity from the disk device to the cache memory (staging) is performed.

In another method, to detect whether the physical disk device is failed, processing is performed by staging even when the data in stripe unit is clean and stored in the cache memory.

<Error Detection Processing>

Figure 8:
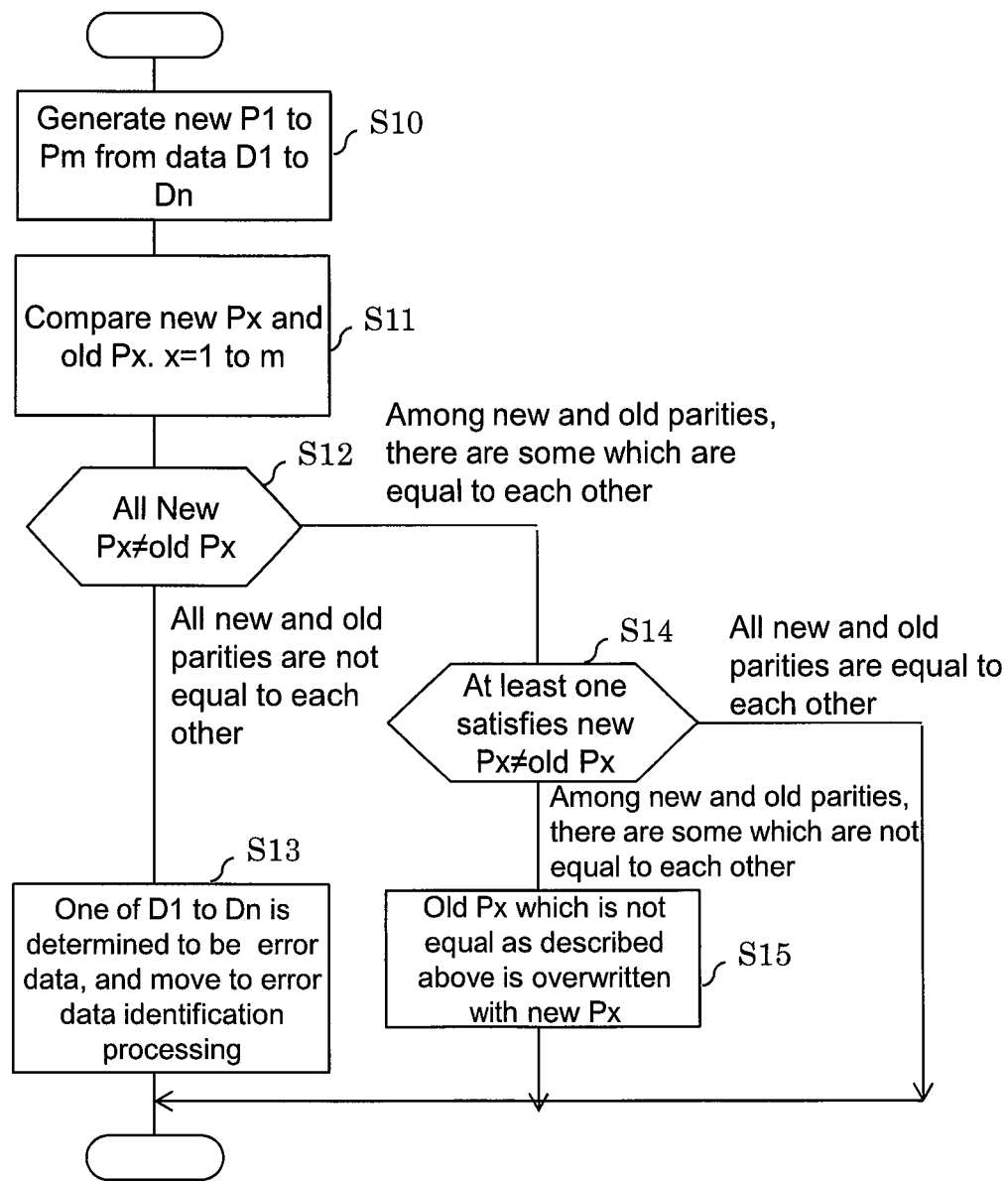
FIG. 8 is a flowchart illustrating processing of error detection.

FIG. 8 is a flowchart illustrating the error detection processing.

The processing is check processing in one stripe unit.

The redundancy is denoted as m and data count is denoted as n. The data is denoted as D and the parity is denoted as P.

The parity is calculated from the current all data $D_x$ (x=1 to n). A piece of parity P1 is a piece of parity calculated by a calculation formula for the piece of parity P1, and a piece of parity P2 is a piece of parity calculated by a calculation formula for the piece of parity P2 that is different from that for the piece of parity P1. In this way, all pieces of parity P1 to Pm are generated. The parity calculation formula is a predetermined calculation formula using EOR, for instance. The pieces of parity P1 to Pm become new pieces of parity P1 to Pm (S10). Hereinafter, a new piece of parity may be called a new P and an old parity may be called an old P.

A parity portion is read from the disk device and is made to be an old P, and whether a new Px and an old Px are equal (S11). All Ps are compared, and when there is no case where a new Px and an old Px are equal and are all different, the processing is moved to S13, and when there is at least one equal pair, the processing is moved to S14 (S12).

When at least one pair whose new piece of parity P and old piece of parity P are equal is found in S14, it is determined that data D is all correct and old pieces of parity of the other data are abnormal values, an old piece of parity in the position where the new and old pieces of parity do not coincide is updated by being overwritten with a value of the new piece of parity (S15). This concludes the error correction processing. At this time, "Restoration of the error portion is completed." may be reported to a user or an instruction source of the processing.

When new and old pieces of parity are all equal in S14, since there is no error portion, processing is ended. At this time, "There is no error portion." may be reported to a user or an instruction source of the processing.

When all new and old pieces of parity are different in S12, it is determined that possibility that there is an abnormality in the data is high, the processing is moved to "error data identification processing" for identifying error data (S13).

<Error Data Identification Processing>

Figure 9:
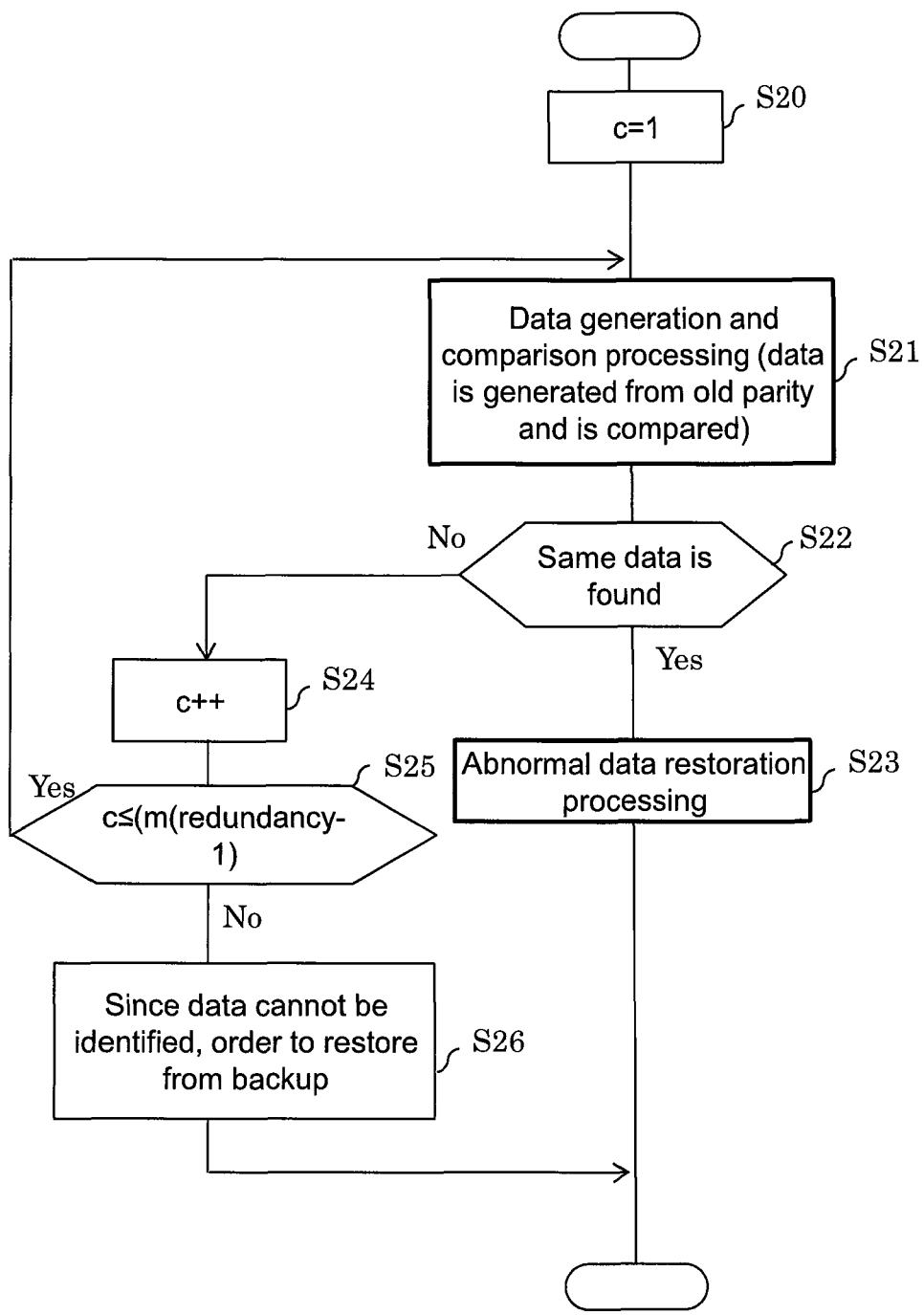
FIG. 9 is a flowchart illustrating processing that is activated when the result is that new and old pieces of parity are all different in processing of FIG. 9.

FIG. 9 is a flowchart illustrating processing to be activated in the processing in FIG. 8 when the result is that new and old pieces of parity are all different.

Accordingly, that the processing of FIG. 9 is activated means that they are cases where there is an abnormality somewhere in the data, old pieces of parity are all broken even when the data is all correct, or the data cannot be read for some reason, etc.

By following a flowchart of error data identification processing of FIG. 9, a description will be made.

The redundancy counter is denoted as c. c=1 represents a single error, in other words, means that an examination is made by assuming that there is one error portion.

When the number of errors is up to the number that is smaller than the number of parity redundancies of a stripe unit by one, error portions can be identified. In the present embodiment, since the redundancy is 2 as an example, error portions in the case of a single failure can be identified and error portions in the case of double or more failures cannot be identified.

An initial value of 1 is substituted into the variable c (S20).

Processing of comparing data by generating from existing pieces of parity is performed (S21). The details of the processing will be described later. When the same data is found in S21 (S22), abnormal data is restored (S23). The details of the processing will be described later. In S22, when the same data is not found, the count c is advanced by one (S24), and whether the c exceeds the redundancy is checked (S25), and when the c does not exceed the redundancy, the same processing is repeated from S21. In S22, when c exceeds the redundancy while no error data is found (No in S25), it can be determined that the redundancy with which data can be identified is exceeded. In that case, an indication is made to restore data from the backed-up data as in the conventional manner (S26).

<Detailed Processing of Step S21>

Figure 10:
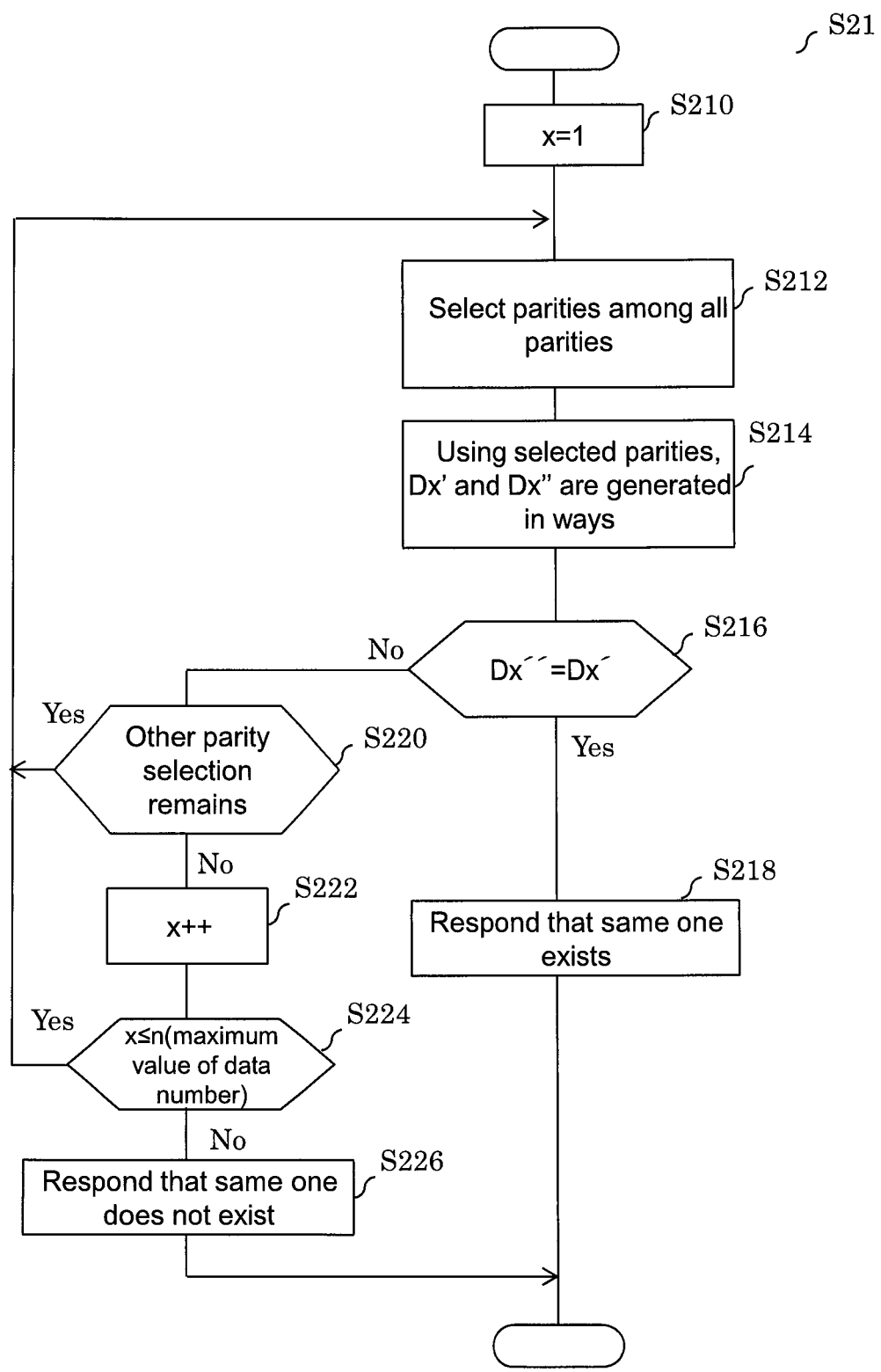
FIG. 10 is a flowchart illustrating processing of generating data from an existing piece of parity and compare.

FIG. 10 is a flowchart illustrating processing of generating data from the existing pieces of parity and comparing them.

First, an initial value is substituted into a variable x (S210). The x represents a data number in a stripe, and the x represents a counter to examine by generating x-th data from other data and pieces of parity.

The c is a redundancy counter, count-up is performed at a flowchart side of FIG. 9, and receive processing is performed by making its value an input value.

A piece of parity is selected from all pieces of parity. For instance, in the case of redundancy of 2 and c=1, a first piece of parity and a second piece of parity are selected. In the case of redundancy of 3 and c=1, two of the first piece of parity, the second piece of parity, and the third piece of parity are selected. For instance, the first piece of parity and the second piece of parity may be selected, or the second piece of parity and the third piece of parity may be selected. In the case of redundancy of 3 and c=2, pieces of parity of two pairs out of the first piece of parity, the second piece of parity, and the third piece of parity are selected. For instance, a pair of the first piece of parity and the second piece of parity may be selected, or a pair of the first piece of parity and the third piece of parity may be selected.

Dx is generated from data other than data Dx and parity (S214). The Dx is generated in two ways. A newly generated data is made to be Dx' and Dx".

When Dx' and Dx" are equal (S216), that there is an equal one is responded and the processing is ended (S218). When Dx' and Dx" are not equal and other parity combinations are left (S220), the processing returns to processing in which Dx' and Dx" are newly generated by using the pieces of parity (to S212).

When all combinations of the pieces of parity are executed and no piece of parity to select is left (No in S220), 1 is added to the variable x to change the target data (S222). When x after being added by 1 does not exceed a data count n, the processing is repeated (Yes in S224), and when x after being added by 1 exceeds the data count n, that pieces of data Dx' and Dx" of a mutually equal value are not found is responded, and the processing is ended (S226).

When equal pieces of data are found in step S216 of FIG. 10, the processing is returned to S22 of FIG. 9 and is moved to abnormal data restoration processing of S23.

<Detailed Processing of S23>

Figure 11:
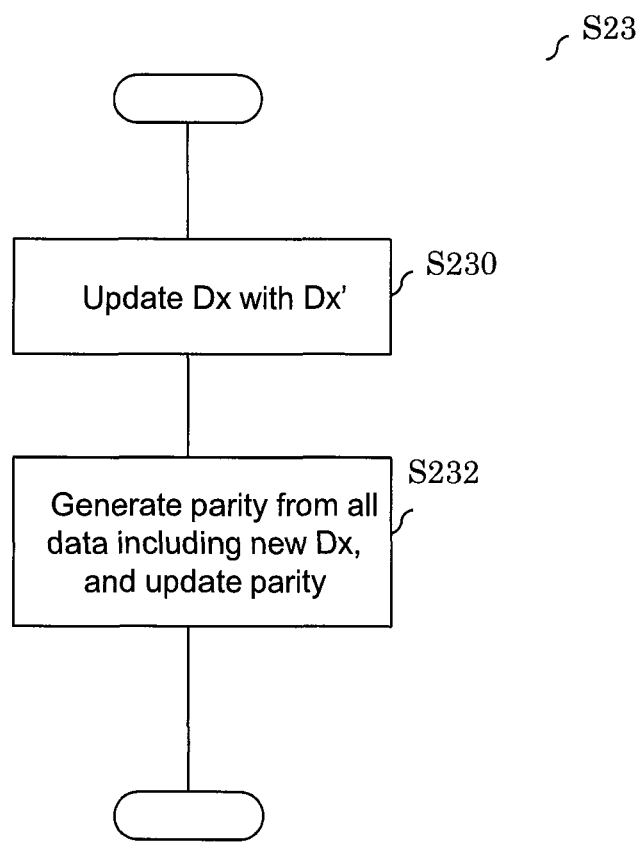
FIG. 11 is a flowchart illustrating processing of abnormal data restoration.

FIG. 11 is a flowchart illustrating the abnormal data restoration processing.

Since it is determined that Dx' and Dx" are equal and Dx is abnormality data, a value of Dx is updated to a value of D' (or D") (S230). When the data part is all updated, new pieces of parity are regenerated from new pieces of data, respectively. When there is an old piece of parity that is different from a new piece of parity, a value of the old piece of parity is updated to a value of the new piece of parity.

In the processing, abnormality data up to (redundancy-1) can be processed. When the number of pieces of abnormal data is more than (redundancy-1), since the number of errors and error portions cannot be determined, data is restored from the backed up data like in the conventional manner.

Figure 12:
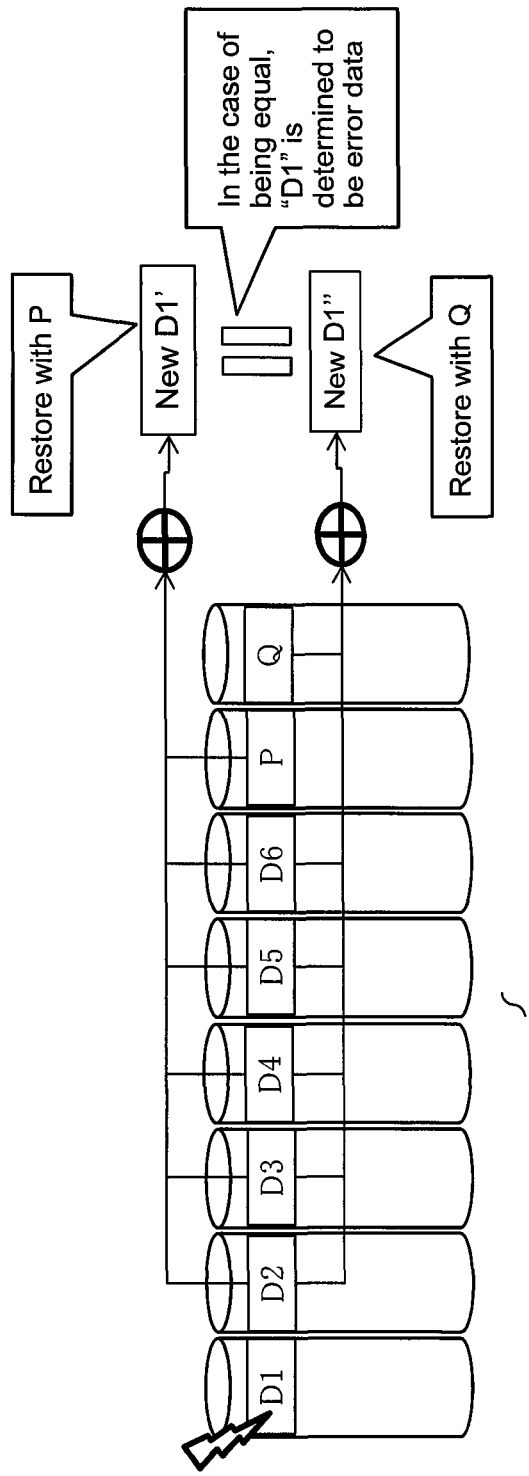
FIG. 12 is a view illustrating a manner of data restoration in the case of redundancy of 2.

FIG. 12 is a view illustrating a manner of data restoration in the case of the redundancy of 2. A piece of data D1 is generated in two ways. One is a new piece of data D1' generated from pieces of data D2 to D6 other than D1 and a first piece of parity P (old), another one is a new piece of data D1" generated from pieces of data D2 to D6 other than D1 and a second piece of parity Q (old).

When a new piece of data D1' and a new piece of data D1" are equal, it can be determined that pieces of data D2 to D6, a first piece of parity P, and a second piece of parity Q are correct. Accordingly, D1 that is being excluded can be determined to be error data. On the other hand, when a new piece of data D1' and a new piece of data D1" are not equal, it is made clear that there is a piece of error data among the pieces of data D2 to D6, the first piece of parity P, and the second piece of parity Q. In this case, whether a piece of data D is correct cannot be determined.

Similarly, concerning a piece of data D2, a new piece of data D2' and a new piece of data D2" are generated and compared. Similar processing is performed for pieces of data of up to D6, when two pieces of new data are never equal, the processing is moved to S24. When it is found that two pieces of new data are equal, the processing is moved to S23 at that time.

Figure 13A:
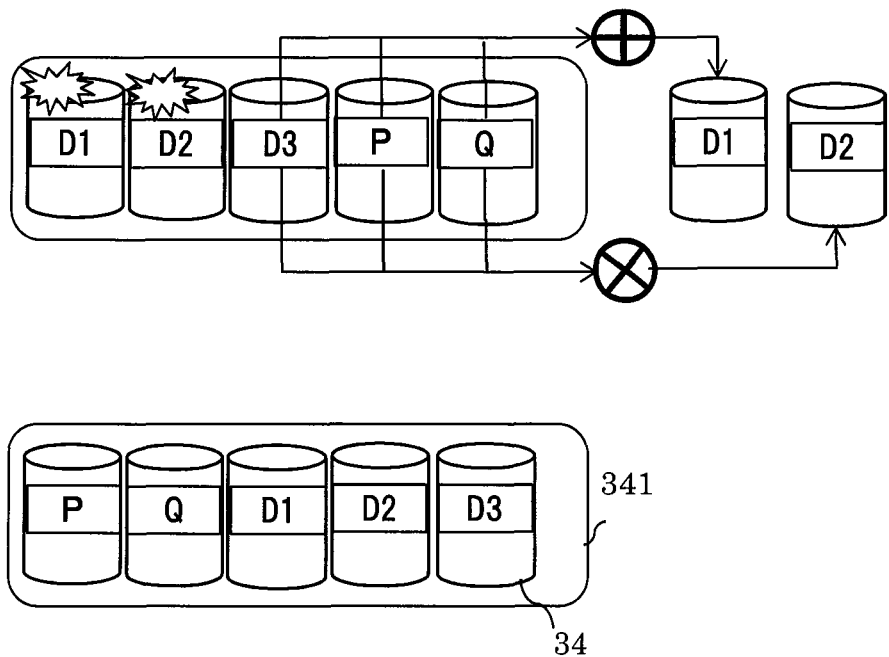
FIG. 13A is a view illustrating a manner of storing data in a physical device.
Figure 13B:
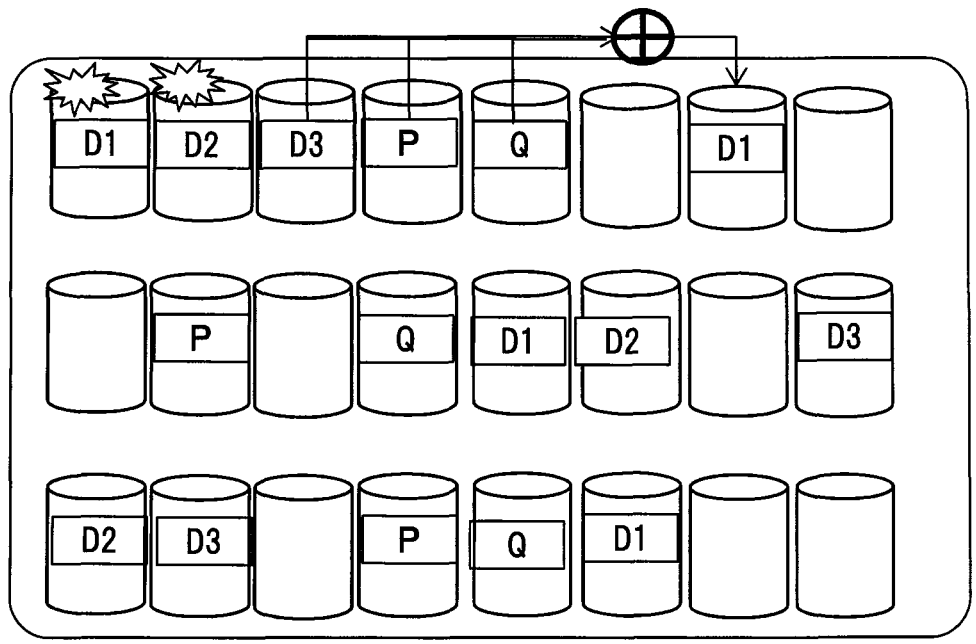
FIG. 13B is a view illustrating a manner of storing data in a physical device.
Figure 13C:
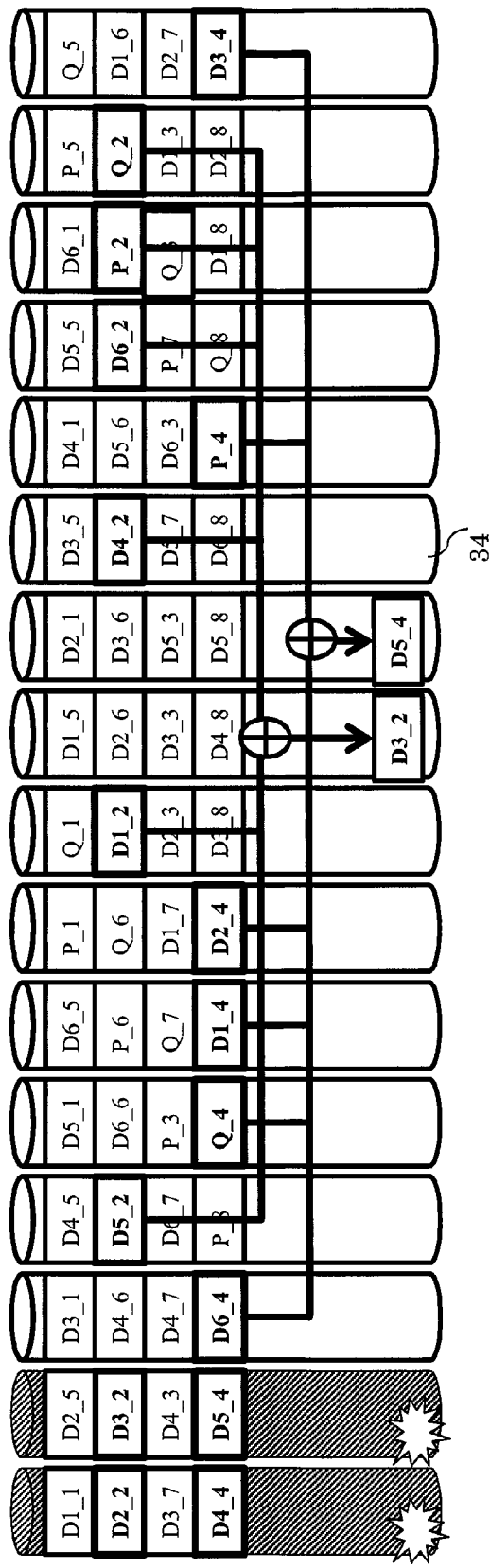
FIG. 13C is a view illustrating a manner of storing data in a physical device.

FIGS. 13A to 13C are views illustrating manners in which data is stored into the physical devices.

In FIG. 13A, a RAID group 341 is constituted of five physical disk devices 34. A stripe is composed of D1, D2, D3, P, and Q. The pieces of data D1, D2, D3 and the pieces of parity P and Q in one stripe exist in the same RAID group 341, and by storing each thereof into mutually different physical disks, availability is improved.

As an example, a case where a piece of data D1 and a piece of data D2 become abnormal as shown in FIG. 13A will be described. By a RAID6, pieces of parity P and Q are stored in the physical devices, respectively. Normal D1 and D2 can be restored with the remaining normal piece of data D3 excluding abnormal pieces of data D1 and D2 and two pieces of parity P and Q. D1 and D2 may be calculated by respectively separate formulas. Or, normal D1 may be calculated from a piece of data D3 and pieces of parity P and Q, and normal D2 may be calculated from calculated normal D1, a piece of data D3, and pieces of parity P and Q. A data recovery method is by a data recovery method in an ordinary RAID6.

In FIG. 13B, there are eight physical disk devices in which pieces of data D1, D2, and D3 stored in three physical disk devices and pieces of parity P and Q stored in two physical disk devices are pieces of data and pieces of parity of the same data unit. They belong to the same stripe, and there are three physical disk devices that are vacant without storing data and parity in the stripe.

As illustrated in FIG. 13C, in a state where data elements and pieces of parity are stored, when left two physical disk devices are failed, required data elements and pieces of parity can be restored by a data recovery method of a RAID6. The restored data is stored in the vacant physical disk devices.

FIG. 13C is a view illustrating an example in which a virtual pool space is constituted by 16 physical disk devices 34 and an RAID group of 6D+2P is constituted in the virtual pool space. Here, in the same figure, it is shown that like D1_1, D2_1, D3_1, D4_1, D5_1, D6_1, P_1, and Q_1, those whose number behind "_" is common are data elements and pieces of parity of the same data unit, in other words, they belong to the same stripe column.

As illustrated in FIG. 13C, in a state where data elements and pieces of parity are stored, even when left two physical disk devices 34 are failed, required data elements and pieces of parity can be restored by a data restoration method of a RAID6. However, when another physical disk device 34 is failed in addition, there exist data elements and/or pieces of parity (called warning data) that cannot possibly be restored. Specifically, when two stripe data elements of the same stripe column are stored in a failed physical disk device 34, the stripe data elements that belong to the stripe column correspond to such unrestorable stripe data elements.

In the same figure, there are a data element D2_2, a data element D3_2, a data element D4_4, and a data element D5_4 that ate two stripe data elements of the same stripe column stored in a failed physical disk device 34. Hereinafter, a parcel containing warning data is referred to as a warning parcel.

Therefore, warning data that cannot be restored when other physical disk device 34 is failed in addition is restored in a preferential manner. For instance, a data element D3-2 and a data element D5_4 shown in the same figure are restored on another physical disk device 34 in a preferential manner. Thereby, even when another physical disk device 34 is failed, since a warning parcel can be quickly restored, the probability of being able to properly restore data elements of the same stripe column as data element D2_2 becomes high. This probability has a specific character of becoming higher as the number of drives to which a stripe column is dispersed becomes larger. As a method of storing data in a physical disk device 34, there is this kind of storage method.

<Activation Timing>

Error detection processing and error data identification processing are activated in LU unit, the activation timing includes many variations as shown below.

(1) Regularly Execution Mode

The error detection processing and the error data identification processing are periodically executed in an asynchronous manner with other processing. Specifically, it can be conceivable to determine execution time and an execution interval in advance and execute in an ordinary I/O processing background.

In addition to the periodic processing execution, when an I/O occurs, the processing may be executed in a synchronous manner therewith.

(2) Remote Activation

In a timing when a user instructs an execution from a management apparatus or a terminal, the error detection processing and the error data identification processing are executed. For instance, the processing may be executed by an instruction from the management apparatus and the terminal coupled to a storage apparatus through a network. The processing may be executed by following an instruction received from other storage apparatus.

(3) Post Drive Copy Execution Mode

When drive copy such as collection copy and dynamic sparing is executed, a storage position of only a part of data is changed. At that time, when an error occurs on data storage position information, for instance, there is a possibility thereafter that data is read not from a new storage position but from an old storage position. Thus, the possibility of an error to occur after the drive copy execution becomes relatively high. Therefore, the error detection processing and the error data identification processing may be executed in that timing.

Whether the error detection processing and the error data identification processing are executed in an above-described activation timing of (1) or (3) may be configured. This may be configured in LU unit, for instance. For instance, when increasing a load of background processing is not desired, the configuration may be performed so that the error detection processing and the error data identification processing are not executed in the timing of either of (1) or (3), or both activations. For an LU for which increasing a load of background processing is not desired, the configuration may be performed so that the error detection processing and the error data identification processing are not executed in the timing of either of (1) or (3), or both activations.

In the present embodiment, when an error is found in the above-mentioned error detection processing, that is reported to the host computer 10. Control can be performed by the host computer 10 that is located in the upstream of the storage apparatus 30 so as not to issue an I/O for a portion where processing of identifying and restoring error data is being performed when an error is detected.

The storage apparatus 30, when the above-mentioned error is found, the processing of identifying and restoring the error data is being performed, and an I/O for the target portion is received, instead of performing the I/O process, that the I/O is not performed may be reported to the host computer 10.

The I/O that is not issued owing to the error restoration or the I/O about which that the processing is not executed owing to the error restoration is reported from the storage apparatus 30 are scheduled in an in accepted order and waited for, the I/O may be issued by following the schedule after the restoration is completed. In that case, the waiting of the I/O may be performed in a range in which a data update state is not influenced and a delay of the data update can be permitted.

As described above, according to the present embodiment, it becomes possible to discover a silent data corruption, identify an error portion, and automatically restore abnormal data. For instance, when, after a data write is executed, the duration until the data is read for the next time is long, since it becomes possible to restore a silent data corruption occurred during that period and read correct data at the time of reading, the present embodiment is especially effective.

REFERENCE SIGNS LIST

1 Computer system
10 Host computer
101A Command issuing apparatus
101B Command issuing apparatus
108 Network
121 Storage area network
20 Management apparatus
30 Storage apparatus
31 CPU (Controller)
310 Host adaptor
31A CPU
31B CPU
32 Memory (Cache memory)
320 Network adaptor
33 Disk interface
33 Shared memory
330 Nonvolatile memory
34 Physical disk device
340 Power supply control unit
341 RAID group
35, 35A, 35B HBA
350 Memory
36, 36A, 36B NIC
360 Processor
37 Management interface
370 Storage adaptor
38 Bus
380 Parity generating unit
380 Shared memory adaptor
390 Network adaptor
40 Storage apparatus
401 Data generation and comparison module
402 Error detection processing module
403 Error data identification processing module
404 Abnormal data restoration module
41A Controller board
41B Controller board
42 Coupling unit
500 Disk device management table
501 Disk drive unit

The invention claimed is:

1. A storage apparatus comprising a control unit configured to manage data that is divided into a plurality of data elements and is stored in a plurality of storage devices, wherein
a plurality of old redundancy codes generated in advance by a plurality of different calculation methods for data containing a plurality of data elements are stored in the storage devices as redundancy codes for the data, and
the control unit includes:
a detecting unit that is configured to detect that the data is incorrect;
an identification unit that is configured to, when the detection unit detects that the data is incorrect, determine that a first data element contained in the data is incorrect, when a first restoration calculation first data element, which is restored from the first data element using other data elements of the data excluding the first data element and a new redundancy code obtained from the data by a first calculation method, coincides with a second restoration calculation first data element, which is restored from the first data element using the other data elements and a new redundancy code obtained from the data by a second calculation method; and
a restoration unit that is configured to correct the first data element in the storage devices that is determined to be incorrect by the identification unit, to either the first restoration calculation first data element or the second restoration calculation first data element.

2. The storage apparatus according to claim 1, wherein
the control unit further includes:
a detection unit that is configured to calculate new redundancy codes from the data stored in the storage devices by the plurality of calculation methods, when old redundancy codes and new redundancy codes corresponding to the old redundancy codes coincide in all calculation methods, to determine that neither the data nor the old redundancy codes are incorrect, while when old redundancy codes and new redundancy codes corresponding to the old redundancy codes do not coincide in all calculation methods, to determine that the data is incorrect, and when old redundancy codes and new redundancy codes corresponding to the old redundancy codes do not coincide in part of the calculation methods, to determine that the old redundancy codes are incorrect, and wherein
the identification unit is configured to, when the data is determined to be incorrect by the detection unit, identify which data element contained in the data is incorrect.

3. The storage apparatus according to claim 2, wherein
the detection unit is configured to, when determining that the old redundancy codes are incorrect, correct redundancy codes in the storage devices to the new redundancy codes.

4. The storage apparatus according to claim 1, wherein
the identification unit is configured to search for incorrect data elements while changing the number of data elements to be excluded as the first data element in a range of from one to (the number of redundancy codes-1).

5. The storage apparatus according to claim 2, wherein
the detection unit is configured to, when data movement occurs between storage devices, execute processing according to the data movement.

6. The storage apparatus according to claim 1, wherein
either the identification unit or the restoration unit, or both thereof are achieved by the processor executing a program stored in a memory within the storage apparatus.

7. The storage apparatus according to claim 1, wherein either the identification unit or the restoration unit, or both thereof are configured of a hardware circuit in the storage apparatus.

8. A storage system comprising:
a storage apparatus in which data is divided into a plurality of data elements and is stored in a plurality of storage devices, and a plurality of old redundancy codes generated in advance by a plurality of different calculation methods for data containing a plurality of data elements are stored in the storage devices as redundancy codes for the data; and
an external apparatus that is coupled to the storage apparatus through a network, wherein
the external apparatus includes:
a detecting unit that is configured to detect that the data is incorrect;
an identification unit that is configured to, when the detection unit detects that the data is incorrect, determine that a first data element contained in the data is incorrect, when a first restoration calculation first data element, which is restored from the first data element using other data elements of the data excluding the first data element and a new redundancy code obtained from the data by a first calculation method, coincides with a second restoration calculation first data element, which is restored from the first data element using the other data elements and a new redundancy code obtained from the data by a second calculation method; and
a restoration unit that is configured to correct the first data element in the storage devices that is determined to be incorrect by the identification unit, to either the first restoration calculation first data element or the second restoration calculation first data element.

9. A data management method for a storage apparatus in which data is divided into a plurality of data elements and is stored in a plurality of storage devices,
a plurality of old redundancy codes generated in advance by a plurality of different calculation methods for data containing a plurality of data elements being stored in the storage devices as redundancy codes for the data,
the data management method comprising:
detecting that the data is incorrect;
determining that, when it is detected that the data is incorrect, a first data element contained in the data is incorrect, when a first restoration calculation first data element, which is restored from the first data element using other data elements of the data excluding the first data element and a new redundancy code obtained from the data by a first calculation method, coincides with a second restoration calculation first data element, which is restored from the first data element using the other data elements and a new redundancy code obtained from the data by a second calculation method; and
correcting the first data element in the storage devices that is determined to be incorrect, to either the first restoration calculation first data element or the second restoration calculation second data element.

10. The data management method according to claim 9, comprising:
calculating new redundancy codes from the data stored in the storage devices by the plurality of calculation methods;
when old redundancy codes and new redundancy codes corresponding to the old redundancy codes coincide in all calculation methods, determining that neither the data nor the old redundancy codes are incorrect;
when old redundancy codes and new redundancy codes corresponding to the old redundancy codes do not coincide in all calculation methods, determining that the data is incorrect;
when old redundancy codes and new redundancy codes corresponding to the old redundancy codes do not coincide in part of the calculation methods, determining that the old redundancy codes are incorrect; and
when the data is determined to be incorrect, identifying which data element contained in the data is incorrect.

* * * * *